(12) United States Patent
Yokota et al.

(10) Patent No.: US 7,024,262 B2
(45) Date of Patent: Apr. 4, 2006

(54) PROCESS MANAGEMENT SYSTEMS AND METHODS OF THE SAME

(75) Inventors: Tsuyoshi Yokota, Nagano-ken (JP); Yoshiyuki Aido, Nagano-ken (JP); Yoichi Nishimura, Nagano-ken (JP); Eiichiro Furihata, Nagano-ken (JP); Yoshihiro Hodozuka, Nagano-ken (JP); Daisuke Osanai, Nagano-ken (JP); Yoshito Tazawa, Nagano-ken (JP); Juliet Chen, Taipei (TW); Eva Lee, Taipei (TW); Lorenzo Lee, Taipei (TW); Lawrence Chuang, Taipei (TW)

(73) Assignee: Seiko Epson Corporation, Tokyo (JP)

( * ) Notice: Subject to any disclaimer, the term of this patent is extended or adjusted under 35 U.S.C. 154(b) by 281 days.

(21) Appl. No.: 10/395,853

(22) Filed: Mar. 25, 2003

(65) Prior Publication Data
US 2004/0111165 A1   Jun. 10, 2004

(30) Foreign Application Priority Data
Mar. 26, 2002   (JP)   ............................ 2002-086067
Oct. 23, 2002   (JP)   ............................ 2002-308718

(51) Int. Cl.
*G06F 19/00* (2006.01)
(52) U.S. Cl. .................. 700/96; 700/115; 700/225
(58) Field of Classification Search .................. 700/96, 700/105, 108–110, 117, 115–116, 221, 215, 700/224, 225–227
See application file for complete search history.

(56) References Cited

U.S. PATENT DOCUMENTS

| | | | |
|---|---|---|---|
| 6,507,765 B1 * | 1/2003 | Hopkins et al. | 700/95 |
| 6,751,522 B1 * | 6/2004 | Okada et al. | 700/164 |
| 2001/0027350 A1 * | 10/2001 | Koga et al. | 700/95 |
| 2002/0147518 A1 * | 10/2002 | Nguyen | 700/108 |

FOREIGN PATENT DOCUMENTS

| | | |
|---|---|---|
| JP | 05-233641 | 9/1993 |
| TW | 454118 B | 9/2001 |

* cited by examiner

*Primary Examiner*—Zoila Cabrera
(74) *Attorney, Agent, or Firm*—Sughrue Mion, PLLC

(57) ABSTRACT

In a manufacturing process management system 10, each of input terminals $40_1$ to $40_n$ located respectively in multiple manufacturing processes of a process flow with regard to a preset product reads a barcode 164 attached to a target 160 and inputs a start of processing with regard to the product. The manufacturing process management system 10 maps the product to a processing status and stores the mapping into a database 130. In response to input of an acquisition request of the processing status with regard to the product from a client PC 50, the manufacturing process management system 10 reads the processing status according to the acquisition request from the database 130, creates a response message, and outputs the created response message to the client PC 50. This manufacturing process management system enables a current location of the preset product to be readily managed in the process flow of the multiple manufacturing processes.

20 Claims, 15 Drawing Sheets

FIG. 2

・ORDERED PRODUCT TABLE

| Order ID | Serial Number | Ordered Product Data |
|---|---|---|
| | | Customer Data |
| | | Data Regarding Payment |

FIG. 3

Tower-Configuration Personal Computer Model XX

Essential Specifications of Main Frame   Be sure to select.

- ▷ OS
- ▷ CPU
- ▷ Memory
- ▷ HDD
- ▷ CD-ROM

· · · ·

Options and Services   Select according to your requirements.

- ▷ Display
- ▷ External USB Device
- ▷ Wireless LAN Adapter
- ▷ Application
- ▷ Printer
- ▷ Scanner

· · · ·

Quantity [   ] Sets      Sub-total [   ]
                         Shipping Charge [   ]
                         Consumption Tax [   ]

Total [   ]

( Next )

FIG. 5

(a) Processing Status Table (When Order is Accepted)

| Order ID | Serial Number | 1st Process | 2nd Process | ... | (n-1)th Process | nth Process |
|---|---|---|---|---|---|---|
| 1234 | 0001 | Not Start | Not Start | ... | Not Start | Not Start |

(b) Processing Status Table (When Entering 1st Process)

| Order ID | Serial Number | 1st Process | 2nd Process | ... | (n-1)th Process | nth Process |
|---|---|---|---|---|---|---|
| 1234 | 0001 | In Progress | Not Start | ... | Not Start | Not Start |

(c) Processing Status Table (When Entering 2nd Process)

| Order ID | Serial Number | 1st Process | 2nd Process | ... | (n-1)th Process | nth Process |
|---|---|---|---|---|---|---|
| 1234 | 0001 | Completed | In Progress | ... | Not Start | Not Start |

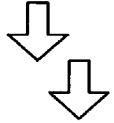

(d) Processing Status Table (When Entering nth Process)

| Order ID | Serial Number | 1st Process | 2nd Process | ... | (n-1)th Process | nth Process |
|---|---|---|---|---|---|---|
| 1234 | 0001 | Completed | Completed | ... | Completed | In Progress |

FIG. 7

(a) Processing Status Table (When Order is Accepted)

| Order ID | Serial Number | 1st Process | 2nd Process | ... | (n−1)th Process | nth Process |
|---|---|---|---|---|---|---|
| 1345 | 0011 | Not Start | Not Start | ... | Not Start | Not Start |
| | 0012 | Not Start | Not Start | ... | Not Start | Not Start |

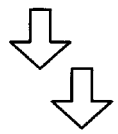

(b) Processing Status Table (When One Entering 2nd Process, While the Other Entering 1st Process)

| Order ID | Serial Number | 1st Process | 2nd Process | ... | (n−1)th Process | nth Process |
|---|---|---|---|---|---|---|
| 1345 | 0011 | Completed | In Progress | ... | Not Start | Not Start |
| | 0012 | In Progress | Not Start | ... | Not Start | Not Start |

FIG. 9

(a) REPAIR-REQUESTED PRODUCT TABLE

| Repair ID | Serial Number | Repair-requested Product Data |
|---|---|---|
| | | Customer Data |
| | | Data Regarding Payment |
| | | Repair Sub-Flow |

(b) PURCHASED PRODUCT TABLE

| Serial Number | Purchased Product Data |
|---|---|
| | |

FIG. 12

(a) Processing Status Table (When Repair Request is Accepted)

| Repair ID | Serial Number | Inspection Process | Repairing Execution Process | Operation Check Process | Wrapping and Shipment Process |
|---|---|---|---|---|---|
| 1234 | 0001 | Not Start | Not Start | Not Start | Not Start |

(b) Processing Status Table (When Entering Inspection Process)

| Repair ID | Serial Number | Inspection Process | Repairing Execution Process | Operation Check Process | Wrapping and Shipment Process |
|---|---|---|---|---|---|
| 1234 | 0001 | In Progress | Not Start | Not Start | Not Start |

(c) Processing Status Table (When Entering Memory Replacement Practice of Repairing Execution Process)

| Repair ID | Serial Number | Inspection Process | Repairing Execution Process | | | Operation Check Process | Wrapping and Shipment Process |
|---|---|---|---|---|---|---|---|
| | | | Memory Repalacement | HDD Replacement | OS Installation | | |
| 1234 | 0001 | Completed | In Progress | Not Start | Not Start | Not Start | Not Start |

(d) Processing Status Table (When Entering HDD Replacement Practice of Repairing Execution Process)

| Repair ID | Serial Number | Inspection Process | Repairing Execution Process | | | Operation Check Process | Wrapping and Shipment Process |
|---|---|---|---|---|---|---|---|
| | | | Memory Replacement | HDD Replacement | OS Installation | | |
| 1234 | 0001 | Completed | Completed | In Progress | Not Start | Not Start | Not Start |

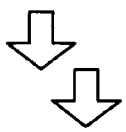

(e) Processing Status Table (When Entering Wrapping and Shipment Process)

| Repair ID | Serial Number | Inspection Process | Repairing Execution Process | | | Operation Check Process | Wrapping and Shipment Process |
|---|---|---|---|---|---|---|---|
| | | | Memory Replacement | HDD Replacement | OS Installation | | |
| 1234 | 0001 | Completed | Completed | Completed | Completed | Completed | In Progress |

FIG. 14
(a) When Repair Request is Accepted
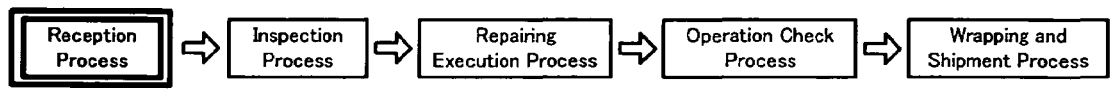
(b) When Entering Inspection Process
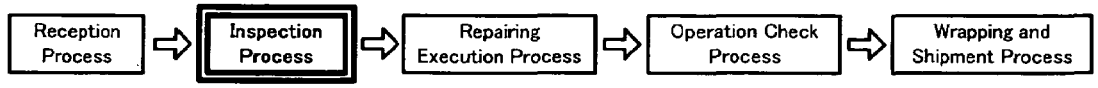
(c) When Entering Repairing Execution Process (Memory Repalacement)
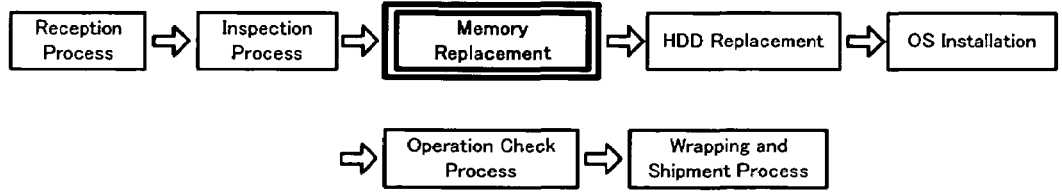
(d) When Entering Repairing Execution Process (HDD Replacement)
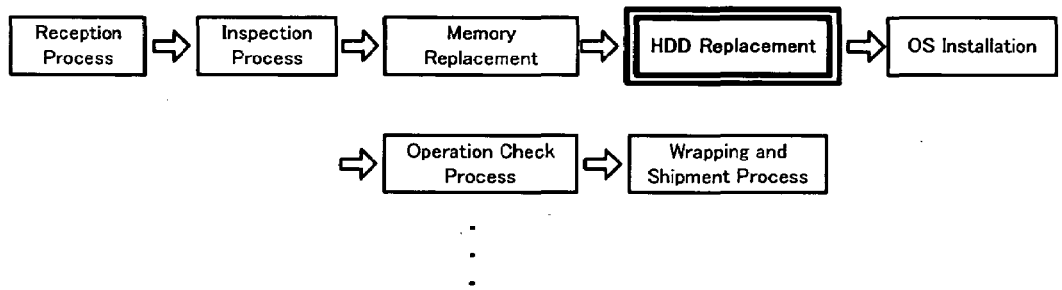
(e) When Entering Wrapping and Shipment Process
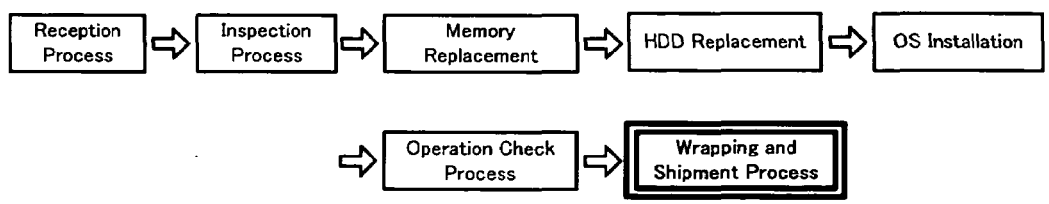

PROCESS MANAGEMENT SYSTEMS AND METHODS OF THE SAME

BACKGROUND OF THE INVENTION

1. Field of the Invention

The present invention relates to process management systems and methods of the same, and more specifically pertains to a manufacturing process management system, a repairing process management system, and their corresponding methods.

2. Description of the Prior Art

Various Web sites have been provided to enable each customer to order a product on the Internet by specifying desired components of the product. In response to an order of the product from the customer, a manufacturer managing such a Web site picks up the customer's desired components, assembles the picked-up components to complete the ordered product, and ships the completed product to the customer. The manufacture naturally demands grasping the current location of the product in a manufacturing flow of multiple manufacturing processes after accepting the order of the product from the customer. The customer, on the other hand, demands grasping the current location of the ordered product in the manufacturing flow of the multiple manufacturing processes as an indication of when the ordered product will be delivered.

Various Web sites have also been provided to enable each customer to give a repair request of a product on the Internet. In response to a repair request of the product from the customer, a manufacturer managing such a Web site receives the defective product, actually carries out repair after determining the specification of the repair, and ships the repaired product to the customer. The manufacturer also receives repair requests from the customer by telephone or by facsimile. The manufacturer naturally demands grasping the current location of the product in a repairing flow of multiple repairing processes after accepting the repair request from the customer. The customer, on the other hand, demands grasping the current location of the repair-requested product in the repairing flow of the multiple repairing processes as an indication of when the repair-requested product will be delivered.

One proposed system of managing the progress in a manufacturing flow is disclosed in JAPANESE PATENT LAID-OPEN GAZETTE No. 5-233641.

In order to attain the demands discussed above, the object of the present invention is to provide a process management system that readily manages a current location of a product in a process flow of multiple processes, especially in a manufacturing process flow of multiple manufacturing processes or in a repairing process flow of multiple repairing processes, as well as a corresponding process management method. The object of the present invention is also to provide a process management system that readily informs a customer of information representing a current location of a product in a process flow of multiple processes, especially in a manufacturing process flow of multiple manufacturing processes or in a repairing process flow of multiple repairing processes, as well as a corresponding process management method.

SUMMARY OF THE INVENTION

In order to achieve at least one part of the aforementioned objects, the present invention is structured as follows.

The present invention is a process management system that manages a current location of a preset product in a process flow of multiple processes for manufacture or repair, the process management system including:

a processing status input module that inputs a processing status of at least one process selected among the multiple processes (referred to as 'management object process') with regard to the preset product;

an information storage module that is capable of storing various pieces of information;

a storage control module that maps the preset product to the processing status and stores the mapping into the information storage module;

a request input module that inputs an acquisition request to acquire the processing status with regard to the preset product; and a response module that reads, in response to the acquisition request, the processing status mapped to the preset product from the information storage module and outputs the read-out processing status to a request source, which has output the acquisition request.

The process management system of the present invention inputs the processing status of at least one process selected among multiple processes with regard to the preset product or at least one management object process, maps the preset product to the processing status, and stores the mapping into the information storage module. In response to input of an acquisition request of the processing status with regard to the product, the process management system reads the processing status according to the acquisition request from the information storage module, and transmits the read-out processing status to the request source that has output the acquisition request. This process management system thus enables the current location of the present product to be readily managed in the process flow of the multiple processes. The 'request source that has output the acquisition request' may be located inside or outside this process management system.

In the process management system of the present invention, the response module may read, in response to the acquisition request, the processing status mapped to the preset product from the information storage module and either directly output the read-out processing status to the request source or convert the read-out processing status into a specific form according to the acquisition request and output the converted processing status to the request source. For one application, in the case of converting the read-out processing status into the specific form according to the acquisition request and outputting the converted processing status to the request source, the response module may generate display information, which enables the process in the read-out processing status to be visually located in the process flow of the multiple processes and output the generated display information to the request source. For another application, the response module may estimate a time required for a residual of the process flow, create a message showing how many hours or how many days are required for completion of the whole process flow, and output the created message to the request source.

In the process management system of the present invention, the processing status input module may specify all the multiple processes in the process flow with regard to the preset product as management object processes and input processing statuses of the specified management object processes. In addition, the request input module may input the acquisition request of the processing status with regard to the preset product from one of a customer who has ordered the preset product, a customer who has requested repair of the preset product, and a system administrator via a network, and the response module may output the processing status to the request source via the network.

When the process management system of the present invention is applied as a system of managing the current location of the preset product in a manufacturing flow of the multiple processes, the system may include a product code assignment module that assigns a product code to each product, wherein the storage control module may map the product code to the processing status and store the mapping into the information storage module; the request input module may input the acquisition request including the product code that identifies the product; and the response module may read, in response to the acquisition request, the processing status corresponding to the product code from the information storage module and output the read-out processing status to the request source. In this case, the process management system may further include: a recording module that records the product code, which is attached to the product that is being manufactured or has been completed and corresponds to the product; and a read-out module that reads the product code recorded in the recording module when the product enters each management object process, wherein the processing status input module, when the product code is read by the read-out module at each management object process, may input a start of processing as the processing status of the management object process. Moreover, the product code may be mapped to packaged component information of the product.

When the process management system of the present invention is applied as a system of managing the current location of the preset product in a manufacturing flow of the multiple processes, the system may include an order code allocation module that allocates one identical order code to at least one product ordered together by a customer, wherein the request input module may input the acquisition request of the processing status with regard to the at least one product with the identical order code allocated thereto; and the response module may read, in response to the acquisition request, the processing statuses with regard to the at least one product from the information storage module, and output the read-out processing statuses to the request source. In this case, the response module may read, in response to the acquisition request, the processing statuses with regard to the at least one product from the information storage module, and output a latest processing status among the read-out processing statuses to the request source.

When the process management system of the present invention is applied as a system of managing the current location of the preset product in a manufacturing flow of the multiple processes, the system may include a product code recognition module that recognizes a product code, which has been assigned in advance to each product, wherein the storage control module may map the product code to the processing status and store the mapping into the information storage module; the request input module may input the acquisition request including the product code that identifies the product; and the response module may read, in response to the acquisition request, the processing status corresponding to the product code from the information storage module and output the read-out processing status to the request source. In this case, the process management system may further include: a recording module that records the product code, which is attached to the product that is being repaired or has been repaired and corresponds to the product; and a read-out module that reads the product code recorded in the recording module when the product enters each management object process, wherein the processing status input module, when the product code is read by the read-out module at each management object process, may input a start of processing as the processing status of the management object process. Moreover, the product code may be mapped to packaged component information of the product.

When the process management system of the present invention is applied as a system of managing the current location of the preset product in a manufacturing flow of the multiple processes, the system may include a repair code allocation module that allocates one identical repair code to at least one product as objects of one repair request given by a customer, wherein the request input module may input the acquisition request of the processing status with regard to the at least one product with the identical repair code allocated thereto; and the response module may read, in response to the acquisition request, the processing statuses with regard to the at least one product from the information storage module, and output the read-out processing statuses to the request source. In this case, the response module may read, in response to the acquisition request, the processing statuses with regard to the at least one product from the information storage module, and output a latest processing status among the read-out processing statuses to the request source.

When the process management system of the present invention is applied as a system of managing the current location of the preset product in a manufacturing flow of the multiple processes, the multiple processes may include a repairing execution process to actually carry out repair. The repairing execution process may follow a repair sub-flow including a series of detailed repair practices carried out with regard to each component to be repaired, and the processing status input module may input the processing status of each detailed repair practice in the repairing execution process, in addition to or in place of the processing status of each process. In this case, the process management system may further include a planning module that plans the repair sub-flow with regard to the preset product as an object of a repair request given by a customer. The planning module may plan the repair sub-flow, based on a result of inspection of the preset product as the object of the repair request given by the customer. In addition, the response module, when the processing status read from the information storage module in response to the acquisition request corresponds to one of the detailed repair practices included in the repair sub-flow, may output information for identifying the corresponding detailed repair practice in the repair sub-flow to the request source.

The present invention is a process management method that uses one or multiple computers with an information storage module to manage a current location of a preset product in a process flow of multiple processes for manufacture or repair, the process management method may include: a processing status input step that causes the computer to input a processing status of at least one process selected among the multiple processes (referred to as 'management object process') with regard to the preset product; a storage control step that causes the computer to map the preset product to the processing status and store the mapping into the information storage module; a request input step that causes the computer to input an acquisition request of acquiring the processing status with regard to the preset product; and a response step that causes the computer to read, in response to the acquisition request, the processing status mapped to the preset product from the information storage module and output the read-out processing status to a request source, which has output the acquisition request.

The process management method of the present invention causes the computer to input the processing status of at least one process selected among multiple processes with regard to the preset product or at least one management object process, maps the preset product to the processing status, and stores the mapping into the information storage module. In response to input of an acquisition request of the processing status with regard to the preset product, the process management method reads the processing status according to the acquisition request from the information storage module and transmits the read-out processing status to the request source that has output the acquisition request. This process management method thus enables the current location of the preset product to be readily managed in the process flow of the multiple processes.

In the process management method of the present invention, the storage control step may map a product code, which is assigned to each product, to the processing status and store the mapping into the information storage module, the request input step may input the acquisition request including the product code that identifies the product, and the response step may read, in response to the acquisition request, the processing status corresponding to the product code from the information storage module and output the read-out processing status to the request source. In this case, the processing status input step may read the product code from a recording module that records the product code, which is attached to the product that is being manufactured or has been completed or that is being repaired or has been repaired and corresponds to the product when the product enters each management object process, and input a start of processing as the processing status of the management object process.

The process management method of the present invention may include an order code allocation step that causes the computer to allocate one identical order code to at least one product ordered together by a customer, wherein the request input step may input the acquisition request of the processing status with regard to the at least one product with the identical order code allocated thereto; and the response step may read, in response to the acquisition request, the processing statuses with regard to the at least one product from the information storage module, and output the read-out processing statuses to the request source. In another case, the process management method of the present invention may include an order code allocation step that causes the computer to allocate one identical repair code to at least one product as objects of one repair request given by a customer, wherein the request input step may input the acquisition request of the processing status with regard to the at least one product with the identical repair code allocated thereto; and the response step may read, in response to the acquisition request, the processing statuses with regard to the at least one product from the information storage module, and output the read-out processing statuses to the request source.

BRIEF DESCRIPTION OF THE DRAWINGS

FIG. 2 shows a purchased product table;

FIG. 3 shows one window displayed on a Web site;

FIG. 5 shows a processing status table;

FIG. 7 shows a processing status table in a modified example of the first embodiment.

FIG. 9 shows a repair-requested product table and a purchased product table;

FIG. 12 shows a processing status table;

FIG. 14 shows processing statuses of repairing processes in a repair flow; and

DESCRIPTION OF THE PREFERRED EMBODIMENTS

Preferred embodiments of the present invention are discussed below with reference to the accompanied drawings. One manufacturing process management system is discussed as a first embodiment, and one repairing process management system is discussed as a second embodiment.

First Embodiment

Figure 1:
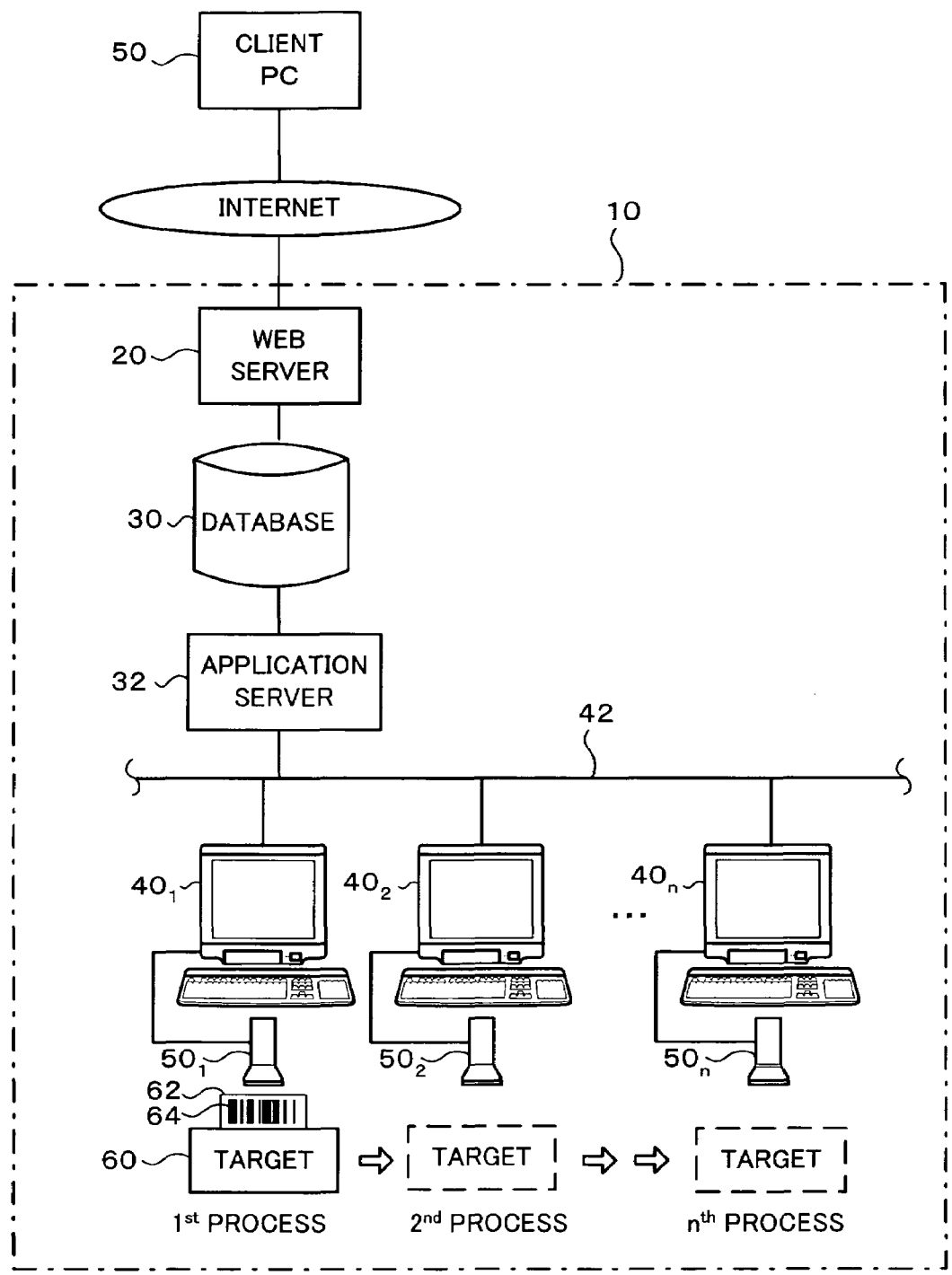
FIG. 1 schematically illustrates the construction of a manufacturing process management system in a first embodiment.

FIG. 1 schematically illustrates the construction of a manufacturing process management system 10 in a first embodiment. The manufacturing process management system 10 includes a Web server 20 that manages a Web site of selling personal computers as computer products, a database 30 that is capable of storing diverse pieces of information, an application server 32 that stores various information input programs and reference function programs, and input terminals $40_1$ to $40_n$ located respectively in manufacturing processes ($1^{st}$ to $n^{th}$ processes) of the personal computers. The Web server 20 and the database 30 are connected with each other via a communication line, while the respective input terminals $40_1$ to $40_n$ are connected with the database 30 via the application server 32 and a LAN 42. A target 60 shown in FIG. 1 represents a product, which is being manufactured or has been completed.

The Web server 20 is connected to a client PC 50 via the Internet. The Web site managed by this Web server 20 provides a service called BTO (build to order), which allows each customer to optionally select desired components including a CPU, a memory, and an HDD and accordingly order a personal computer consisting of the selected components. The Web server 20 allocates an order ID (order code) to each order given by a customer through operations of the client PC 50, assigns a serial number (product code) to each ordered product included in the order, and registers the details of the order in a format corresponding to the allocated order ID and the respective serial numbers.

The database 30 stores an ordered product table and a processing status table. The ordered product table has registration of the details of each order transmitted from the client PC 50 to the Web server 20 via the Internet. More specifically, as shown in FIG. 2, the ordered product table stores ordered product data including the model and the type of each ordered product and the customer's desired components, customer data including the name, the postal address, the telephone number, and the mail address of the customer, and data regarding payment in a specific format corresponding to the allocated order ID and the assigned serial number. The processing status table stores the processing statuses input into the respective input terminals $40_1$ to $40_n$ via corresponding barcode readers $50_1$ to $50_n$ in a specific format corresponding to the allocated order ID and the assigned serial number, as shown in FIG. 5.

The input terminals $40_1$ to $40_n$ are located respectively in the $1^{st}$ to $n^{th}$ manufacturing processes between a start of manufacture of a product and shipment of the manufactured product. In response to an input of the processing status in each manufacturing process, the input processing status is written into the database 30 in the specific format corresponding to the order ID and the serial number. The input terminals $40_1$ to $40_n$ are connected with the barcode readers $50_1$ to $50_n$, which respectively read a barcode 64 on a barcode label 62 attached to the target 60 under production. The barcode label 62 is attached to the casing of the target 60, and the barcode 64 represents the serial number assigned to each product by the Web server 20.

The $1^{st}$ to $n^{th}$ manufacturing processes are defined in this embodiment as follows: the $1^{st}$ process represents pick-up of the customer's desired components, the $2^{nd}$ process represents assembly of the picked-up components, the $(n-1)^{th}$ process represents wrapping of a manufactured product, and the $n^{th}$ process represents final inspection and subsequent shipment.

The customer orders a personal computer on the Web site managed by the Web server 20 through operations of the client PC 50 according to the following procedure. Here it is assumed that the customer selects a 'personal computer of tower configuration, model XX' as an ordered product on this Web site. The Web server 20 then transmits a window, which allows the customer to select desired components of the personal computer in the BTO manner, to the client PC 50 via the Internet. FIG. 3 shows a window displayed for this purpose. In this example, 'OS', 'CPU', 'Memory', and other components as 'Essential Specifications of Main Frame' are selectable according to the customer's requirements among options in respective pull-down menus. 'Display', 'Application', and other components as 'Options & Services' are also selectable according to the customer's requirements among options in respective pull-down menus. In response to the customer's selection of each desired component in the pull-down menu, the price of the selected component is reflected on a 'Sub-total' box, a 'Consumption Tax' box, and a 'Total' box. A default value '1' appears on a 'Quantity' box. When the customer requires ordering two or more sets of the personal computer, the required number is to be input into this 'Quantity' box. In response to a click of a 'Next' button after completion of the input on this window, another window (not shown) is open to ask the customer to set a payment policy. The customer sets the payment policy and then opens still another window (not shown) to input the customer data including the postal address and the name of the customer. In response to a click of an 'Order' button after input of all the required data, the details of the order are transmitted from the client PC 50 to the Web server 20 via the Internet. The Web server 20 allocates one order ID to the transmitted order, assigns a serial number to each product included in the order, and registers the ordered product data and the customer data into the ordered product table (see FIG. 2) of the database 30 in the specific format corresponding to the allocated order ID and the assigned serial number. At the stage of receiving the order, an entry 'Not Start' is registered into all boxes of the $1^{st}$ to $n^{th}$ processes in the processing status table of the database 30 in the specific format corresponding to the currently allocated order ID and the serial number (see FIG. 5($a$)).

Figure 4:
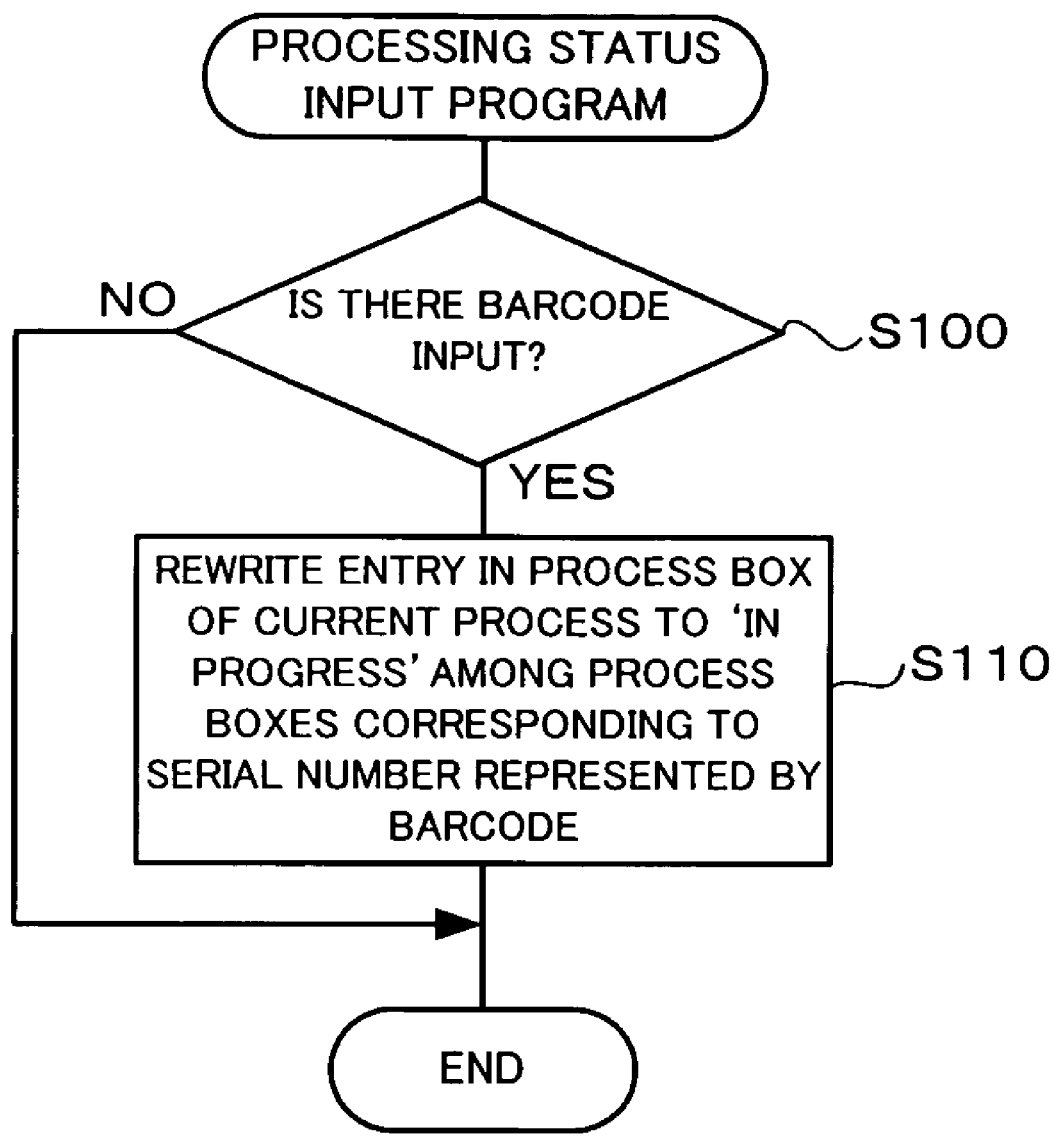
FIG. 4 is a flowchart showing a processing status input program executed by each input terminal.

A processing status input routine executed by each of the input terminals $40_1$ to $40_n$ in the respective processes is discussed below with reference to FIG. 4. Each of the input terminals $40_1$ to $40_n$ reads a processing status input program from the application server 32, and a non-illustrated built-in CPU of each of the input terminals $40_1$ to $40_n$ executes this processing status input program at every preset timing (for example, at every several msec). When this program starts, the input terminal 40 first determines whether or not the corresponding one of the barcode readers $50_1$ to $50_n$ has read the barcode 64 on the barcode label 62 attached to the target 60 (step S100). When no barcode 64 has been read in, the program is terminated immediately. When the barcode 64 has been read in, on the other hand, the input terminal 40 rewrites the entry in a box of the manufacturing process corresponding to the input terminal from 'Not Start' to 'In Progress', while rewriting the entry in a box of the last manufacturing process from 'In Progress' to 'Completed', among boxes of the multiple manufacturing processes corresponding to the serial number represented by the barcode 64 in the processing status table of the database 30 (step S110). The program is then terminated. The $1^{st}$ process does not have the last manufacturing process, so that the operation of rewriting the entry in the box of the last manufacturing process at step S110 is omitted. The operator may carry out the operation of reading the barcode 64 with one of the barcode readers $50_1$ to $50_n$. The reading operation of the barcode 64 with one of the barcode readers $50_1$ to $50_n$ may otherwise be automated by automatically transporting the target 60 to a specific position where the barcode reader $50_1$ to $50_n$ can read the barcode 64 attached to the target 60.

For example, it is assumed that an order ID '1234' has been allocated to a current order and that a serial number '0001' has been assigned to only one product included in the current order. When the target 60 with the serial number '0001' is sent to the $1^{st}$ process or the pick-up process, the barcode reader $50_1$ reads the barcode 64 on the barcode label 62 attached to the casing of the target 60. The input terminal $40_1$ inputs the current state showing that the personal computer of the serial number '0001' has entered the $1^{st}$ process, via the barcode reader $50_1$. The input terminal $40_1$ then changes the entry in the box of the $1^{st}$ process from 'Not Start' to 'In Progress' among boxes of multiple manufacturing processes corresponding to the serial number '0001' in the processing status table of the database 30. FIG. 5($b$) shows the details of the processing status table of the database 30 at this moment.

When the target 60 is sent to the $2^{nd}$ process or the assembly process, the barcode reader $50_2$ reads the barcode 64 on the barcode label 62 attached to the casing of the target 60. The input terminal $40_2$ inputs the current state showing that the personal computer of the serial number '0001' has entered the $2^{nd}$ process, via the barcode reader $50_2$. The input terminal $40_2$ then changes the entry in the box of the $2^{nd}$ process from 'Not Start' to 'In Progress' among the boxes of the multiple manufacturing processes corresponding to the serial number '0001' in the processing status table of the database 30, while changing the entry in the box of the previous process or the $1^{st}$ process from 'In Progress' to 'Completed'. FIG. 5($c$) shows the details of the processing status table in the database 30 at this moment.

When the target 60 is sent to the nth process or the final inspection and shipment process, the barcode reader $50_n$ reads the barcode 64 on the barcode label 62 attached to the casing of the target 60. The input terminal $40_n$ inputs the current state showing that the personal computer of the serial number '0001' has entered the $n^{th}$ process, via the barcode reader $50_n$. The input terminal $40_n$ then changes the entry in the box of the $n^{th}$ process from 'Not Start' to 'In Progress' among the boxes of the multiple manufacturing processes corresponding to the serial number '0001' in the processing status table of the database 30, while changing the entry in the box of the previous process or the $(n-1)^{th}$ process from 'In Progress' to 'Completed'. FIG. 5(d) shows the details of the processing status table in the database 30 at this moment.

Figure 6:
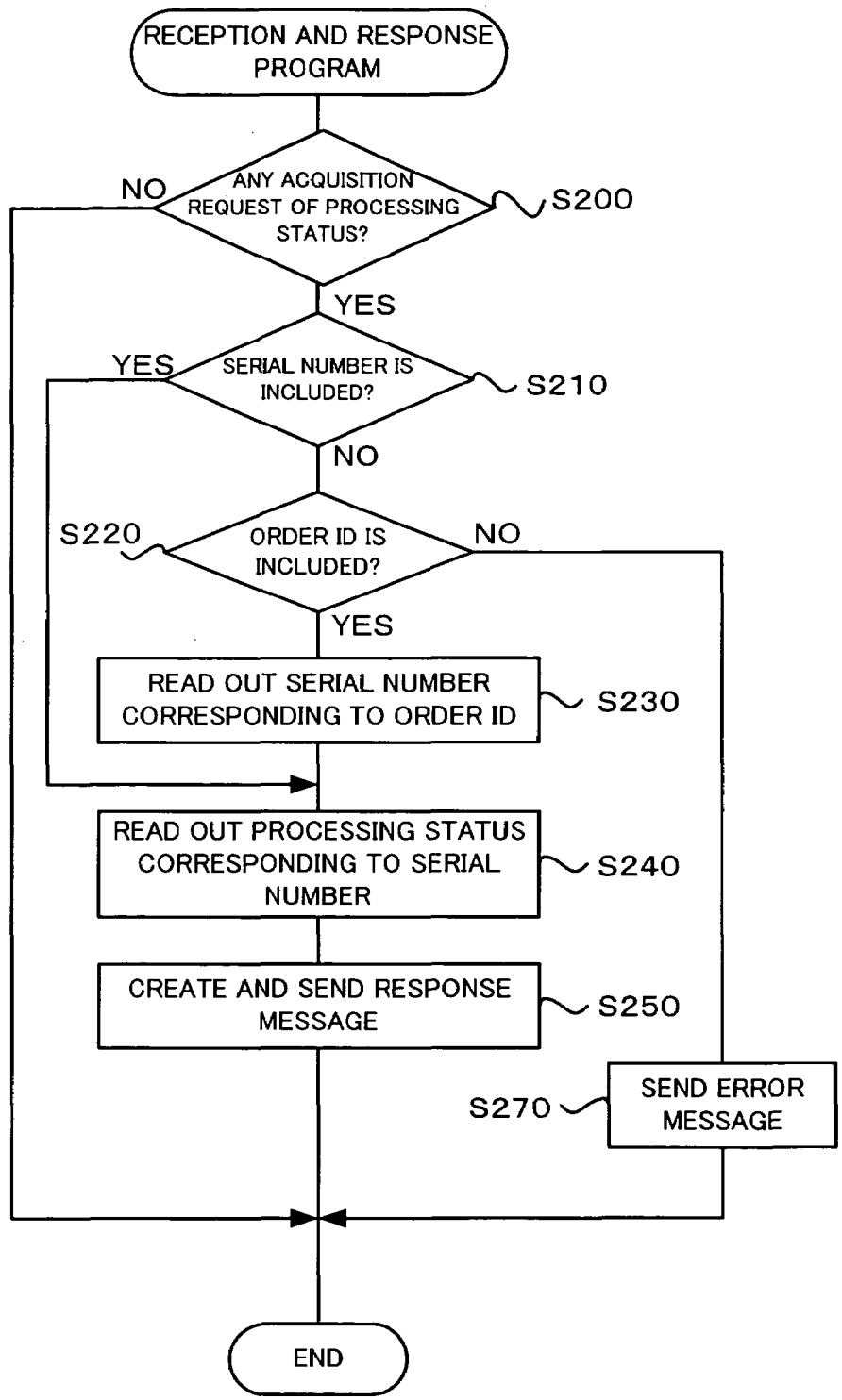
FIG. 6 is a flowchart showing a reception and response program executed by a Web server.

A reception and response process executed by the Web server 20 is discussed below with reference to FIG. 6. A reception and response program is installed in a non-illustrated HDD of the Web server 20, and a non-illustrated built-in CPU reads and executes this reception and response program at every preset timing (for example, at every several msec). When this program starts, the Web server 20 first determines whether or not there is any inquiry from the customer concerning the location of a product included in the customer's order in a manufacturing flow of multiple processes, that is, whether or not there is any acquisition request of the processing status with regard to the ordered product (step S200). When there is no acquisition request, the program is terminated immediately. When there is an acquisition request, on the other hand, the Web server 20 determines whether or not the acquisition request includes a serial number (step S210). In the structure of this embodiment, the mailer of the client PC 50 used by the customer receives the order ID allocated to each customer's order and the serial number assigned to each product included in the order in the form of an Internet mail, which is automatically sent from the Web server 20 after the customer's ordering. The customer is accordingly supposed to attach at least either of the order ID and the serial number to the acquisition request of the processing status.

When the acquisition request does not include any serial number, the Web sever 20 determines whether or not the acquisition request includes an order ID (step S220). When neither the serial number nor the order ID is included, retrieval of the processing status is impossible. The Web server 20 accordingly sends an error message to the client PC 50 of the customer (step S270) and terminates this program. When the acquisition request includes an order ID, on the other hand, the Web server 20 reads out the serial number corresponding to the order ID included in the acquisition request (step S230). When the acquisition request includes the serial number at step S210 or after the serial number corresponding to the order ID is read out at step S230, the Web server 20 reads the processing status corresponding to the serial number from the processing status table of the database 30 (step S240), and creates a response message according to the read-out processing status and sends the created response message to the client PC 50 of the customer (step S250). The program is then terminated.

For example, in response to the acquisition request of the processing status at the stage of FIG. 5(a), a response message like 'Your order has not yet started manufacturing' is created and sent. In response to the acquisition request of the processing status at the stage of FIG. 5(b), a response message like 'Your order has entered the component pick-up process is created and sent. In response to the acquisition request of the processing status at the stage of FIG. 5(c), a response message like 'Your order has entered the assembly process' is created and sent. In response to the acquisition request of the processing status at the stage of FIG. 5(d), a response message like 'Your order will be subject to shipment soon' is created and sent. Each response message may include an additional message like 'Your order will be shipped in XX days' by taking into account the number of dates required for the residual manufacturing flow. One preferable application gives an illustration of the manufacturing flow from the $1^{st}$ process to the $n^{th}$ process and displays a current process in progress on the manufacturing flow in a visually recognizable manner, such as color coding, lighting, or flashing.

The components of this embodiment are mapped to the components of the present invention as follows: The input terminals $40_1$ to $40_n$ of this embodiment correspond to the processing status input module of the present invention, the database 30 corresponds to the information storage module, and the input terminals $40_1$ to $40_n$ and the Web server 20 correspond to the storage control module. The Web server 20 corresponds to the request input module, the response module, the product code assignment module, and the order code allocation module. The barcode label 62 corresponds to the recording module, and the barcode readers $50_1$ to $50_n$ correspond to the read-out module.

In the structure of the embodiment discussed above, each of the input terminals $40_1$ to $40_n$ inputs the processing status of each manufacturing process with regard to each product ordered by the customer, maps the serial number of the product to the processing status, and stores the mapping into the database 30. The Web server 20 receives an acquisition request of the processing status with regard to the product from the client PC 50 of the customer, reads the processing status from the database 30 in response to the acquisition request, and sends back the read-out processing status to the client PC 50. This arrangement facilitates management of the location of each customer's ordered product in the manufacturing flow of the multiple manufacturing processes.

The input terminals $40_1$ to $40_n$ are located in all the manufacturing processes, so that all the manufacturing processes are specified as the management object processes. Compared with the arrangement of specifying only typical manufacturing processes as the management object processes, this arrangement allows for accurate grasp of the current location of the customer's ordered product in the manufacturing flow of the multiple manufacturing processes.

In each manufacturing process, the entry of the processing status with regard to the process is changed from 'Not Start' to 'In Progress' by simply reading the barcode 64 or the product code on the barcode label 62 attached to the target 60, which is being manufactured or has been completed. This desirably simplifies the input operation of the processing status.

The customer is conveniently allowed to give an order of a desired product and make an inquiry concerning the processing status on the Web site managed by the Web server 20 via the Internet through operations of the client PC 50.

The Web server 20 allocates one order ID to each order given by the customer, assigns a serial number to each of multiple products included in the order, and registers the processing status of each manufacturing process in the specific format corresponding to the order ID and the serial number into the processing status table of the database 30. When the target 60 is sent to each manufacturing process, the corresponding one of the input terminals $40_1$ to $40_n$ changes the entry of the processing status with regard to the manufacturing process to 'In Progress' in the specific format corresponding to the order ID and the serial number in the database 30. The Web server 20 receives an acquisition request of the processing status with regard to each product included in the customer's order or the customer's ordered product from the client PC 50 of the customer, reads the processing status from the database 30 in response to the acquisition request, and sends back the read-out processing status to the client PC 50. This arrangement allows for adequate management of the manufacturing processes with regard to the multiple products included in one order given by the customer.

The structure of the embodiment discussed above may be modified in various ways. For example, when there are multiple serial numbers corresponding to the order ID at step S230, that is, when one order includes multiple products, the program may read the processing status corresponding to each serial number from the processing status table at step S240 and may create and send a response message according to the latest processing status among the read-out processing statuses at step S250. In a concrete example of FIG. 7, the order ID is '1234' and the serial numbers included in the order ID are '0011' and '0012'. In this case, in response to the acquisition request of the processing status at the stage of FIG. 7(a), a response message like 'The ordered product has not yet started manufacturing' may be created and sent. In response to the acquisition request of the processing status at the stage of FIG. 7(b), the processing status of the serial number '0012' is the latest processing status. A response message like 'The ordered product has entered the component pick-up process' may thus be created and sent according to this latest processing status. The response message created and sent according to the product in the latest processing status among the multiple products is generally sufficient as the index of the shipment time. This arrangement saves the required quantity of information and thus ensures a quick response. Each response message may include an additional message like 'The ordered product will be shipped in XX days' by taking into account the number of dates required for the residual manufacturing flow with regard to the product in the latest processing status. The processing statuses with regard to all the products included in one order ID may otherwise be sent to the client PC 50 of the customer.

In the structure of the above embodiment, the Web server 20 is assigned to retrieve the database 30 based on the serial number and the order ID and to create and send the response message, besides management of the Web site. In one possible modification, multiple servers may be used to share these required functions. For example, the Web server 20 takes charge of management of the Web site and transmission of the response message, whereas another server takes charge of retrieval of the database 30 based on the serial number and the order ID and creation of the response message.

In the structure of the above embodiment, the barcode readers $50_1$ to $50_n$ are used to read the barcode 64 or the serial number and input the serial number into the corresponding input terminals $40_1$ to $40_n$. In one possible modification, the operator may manually input the serial number into the corresponding input terminals $40_1$ to $40_n$ through operations of the keyboard and the mouse. In another possible modification, an IC chip seal, on which the serial number is recorded, instead of the barcode label 62, is bonded to the target 60, and an IC chip reader reads the serial number on the IC chip seal and inputs the serial number into the corresponding input terminals $40_1$ to $40_n$.

The above embodiment regards the case of giving an order via the Internet. The procedure of the embodiment may also be applicable to orders by telephone. In this case, the operator manually inputs an order into the Web server 20 through operations of the keyboard and the mouse. In the same manner as the embodiment discussed above, the Web server 20 allocates one order ID to each order and assigns a serial number to each product included in the order.

The structure of the above embodiment manages the processing statuses with regard to all the manufacturing processes. One possible modification may select typical processes among all the manufacturing processes and manage the processing statuses of the selected processes.

In the structure of the above embodiment, the acquisition request is input from the client PC 50 of the customer. Instead of or in addition to such input, the acquisition request may be output from a management computer, which is connected to the LAN 42 of the system 10, to the Web server 20. This modification facilitates management of the manufacturing process of each product in the system.

In the structure of the above embodiment, the input terminals $40_1$ to $40_n$ execute the processing status input program, while the Web server 20 executes the reception and response program. In one possible modification, the Web server 20 may execute both of these programs. For example, the Web server 20 is connected to the LAN 42 to receive barcode information read by the barcode readers $50_1$ to $50_n$ and to execute the processing of step S110.

Second Embodiment

Figure 8:
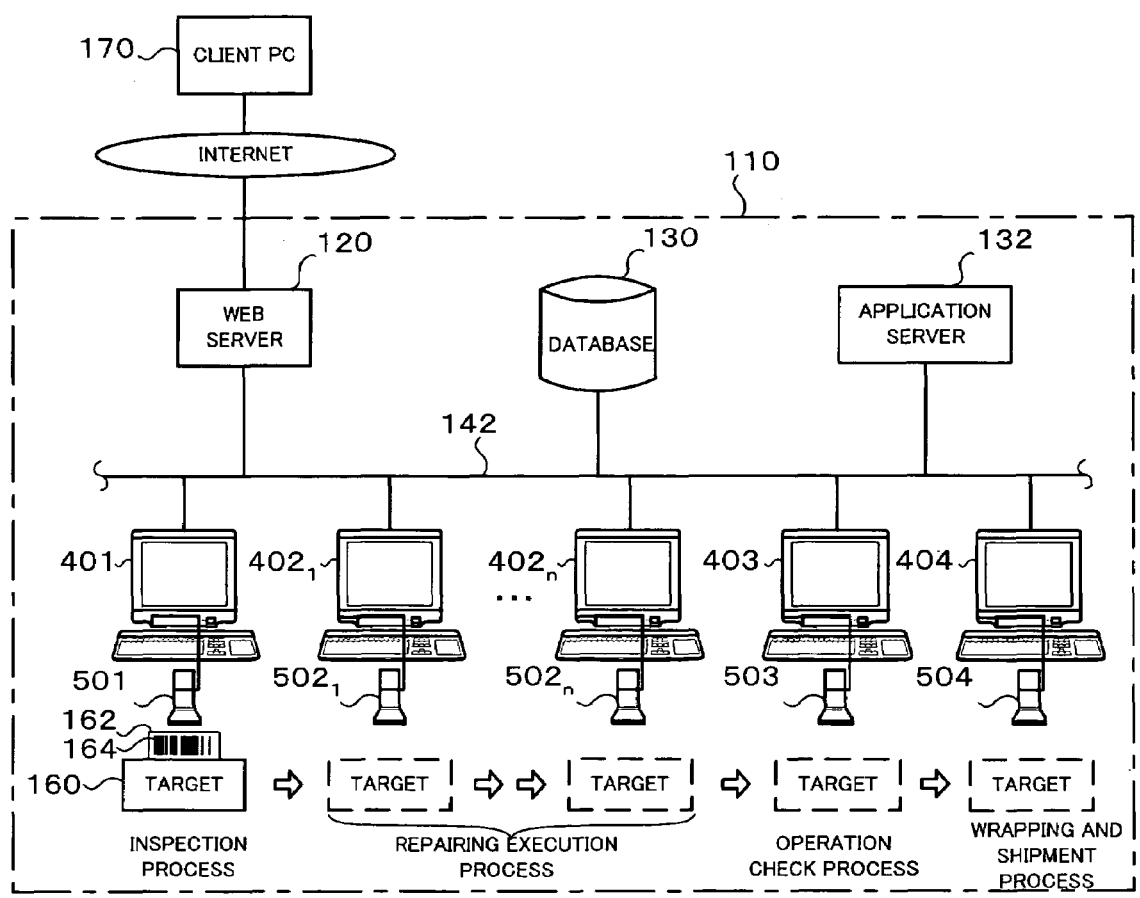
FIG. 8 schematically illustrates the construction of a repairing process management system in a second embodiment.

FIG. 8 schematically illustrates the construction of a repairing process management system 110 in a second embodiment. The repairing process management system 110 includes a Web server 120 that manages a Web site of selling and repairing personal computers as computer products, a database 130 that is capable of storing diverse pieces of information, an application server 132 that stores various information input programs and reference function programs, and input terminals 401 to 404 corresponding to respective repairing processes of the personal computers. In a repairing execution process, input terminals $402_1$ to $402_n$ are located respectively in detailed repair practices in a repair sub-flow. The Web server 120, the database 130, the application server 132, and the input terminals 401 to 404 are mutually connected via a LAN 142. A target 160 shown in FIG. 8 represents a product, which is going to be repaired, being repaired, or has been repaired.

The Web server 120 allocates one repair ID (repair code) to each repairing request from a client PC 170 sent via the Internet. The Web server 120 receives a serial number (product code), which has been assigned in advance to each product as an object of repair, from the client PC 170 and registers the details of the repairing request in a specific format corresponding to the repair ID and the serial number into a repair-requested product table (see FIG. 9(a)) of the database 130. The Web server 120 plans the repair sub-flow including multiple detailed repair practices, based on inspection results of the product as the repair object, and sends back the processing status in response to an acquisition request of the processing status with regard to the product from the client PC 170. The serial number has been assigned to each product at the time of assembly and is mapped to product information packaged in the product (packaged component information).

The database 130 stores a purchased product table, the repair-requested product table, and a processing status table.

The purchased product table is created at the time of assembly of each product and stores purchased product data, such as the type and the model of the purchased product and the packaged component information, in a specific format corresponding to the serial number of the purchased product as shown in FIG. 9(b). The repair-requested product table is created when the customer gives a repairing request of a product, which the customer has purchased on the Web site managed by the Web server 120. As shown in FIG. 9(a), the repair-requested product table stores repairing product data including the type and the model of the product and the packaged component information, customer data, and data regarding payment in a specific format corresponding to the repair ID and the serial number assigned to the repair-requested product. The processing status table has the storage representing the location of the repair-requested product in a repair flow of multiple repairing processes, as shown in FIG. 12.

The input terminals 401 to 404 are located in the respective processes from a start of repairing a repair-requested product to completion of the repair and subsequent shipment. In response to input of the processing status in each process, the input processing status is written into the processing status table of the database 130 in the specific format corresponding to the repair ID and the serial number. The input terminals 401 to 404 are connected with barcode readers 501 to 504, which read a barcode 164 on a barcode label 162 attached to the target 160. In the repairing execution process, the input terminals $402_1$ to $402_n$ are located in the respective detailed repair practices in the repair sub-flow. These input terminals $402_1$ to $402_n$ are connected with barcode readers $502_1$ to $502_n$. The barcode label 162 is attached to the casing of the target 160 at the time of assembly of each product and represents the serial number assigned to the product. The serial number is also expressed in figures on the barcode label 162.

The repairing process of this embodiment includes a reception process, an inspection process, the repairing execution process, an operation check process, and a wrapping and shipment process. The product as the object of the repairing request from the customer is processed in this order. The reception process inputs the repair-requested product data, the customer data, and the data regarding payment. The inspection process inspects the failed state of the repair-requested product. The repairing execution process actually executes a series of repairing operations according to the repair sub-flow, in which the detailed repair practices are arranged in time series with regard to each component to be repaired. Here it is assumed that the repair-requested product is a personal computer and that the components to be repaired are a memory and an HDD. In this case, three detailed repair practices are required: replacement of the memory, replacement of the HDD, and installation of an OS accompanied with the replacement of the HDD. The repair sub-flow carries out replacement of the memory, replacement of the HDD, and installation of the OS in this order. The repair sub-flow may alternatively carry out replacement of the HDD, replacement of the memory, and installation of the OS in this order. The operation check process checks operations of the components repaired in the repairing execution process. The wrapping and shipment process wraps the repaired product and ships the wrapped product.

Figure 10:
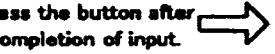
FIG. 10 shows one window displayed on a Web site.

The customer gives a repair request of a personal computer, which has been purchased on the Web site managed by the Web server 120, on the Web site through operations of the client PC 170 according to the following procedure. The client PC 170 fetches a repair request form page (see FIG. 10) from the Web server 120 via the Internet and displays the fetched repair request form page. In the repair request form page, as items of 'Essential Entry', 'Type of Personal Computer' and 'Personal Computer Model' are selectable among options in respective pull-down menus, and 'Serial Number' is input from the keyboard. The serial number is expressed in figures on the barcode label 162, and the customer is required to input the figures. When a 'Specification Display' button is clicked after filling the items of the 'Essential Entry', the serial number and the other information are transmitted to the Web server 120 via the Internet. The Web server 120 retrieves the purchased product table (see FIG. 9(b)) of the database 130 based on the received serial number, reads out specification-related information among the purchased product data corresponding to the serial number, and transmits the read-out specification-related information to the client PC 170. The client PC 170 displays the specification of 'OS', 'CPU', 'Memory', and other components in a middle field of the repair request form page, based on the transmitted specification-related information. Namely a click of the 'Specification Display' button after input of all the items of 'Essential Entry' causes the specification of 'OS', 'CPU', 'Memory', and other components to be automatically displayed. The specification-related information sent from the Web server 120 represents the specification at the time of purchase of the personal computer. If the specification is modified after the purchase, the customer is required to input the modified specification in the corresponding pull-down menus or through operations of the keyboard. A 'Components Possibly Failed' field has options 'CPU', 'Memory', 'HDD', and other components. The customer opens respective pull-down menus of components possibly failed and selects 'Out of Order'. If the components possibly failed are unknown, the customer may keep these boxes blank. A default value '1' appears on a 'Total Number' box. When the customer gives the repair request for two or more sets of personal computers, the required number is to be input into this 'Total Number' box. In the case of the repair request for two or more sets of the personal computers, the repair request form page is displayed for each set. The customer fills in the required items of 'Essential Entry' with regard to each set and clicks the 'Specification Display' button to automatically display the specification. On completion of the input and the display on the repair request form pages for all the sets, the customer is allowed to click a 'Next' button.

In response to a click of the 'Next' button after completion of the input on this repair request form page, another window (not shown) is open to ask the customer to set a payment policy. The customer sets the payment policy and then opens still another window (not shown) to input the customer data including the postal address and the name of the customer. In response to a click of a 'Repair Request' button (not shown) after input of all the required data, the details of the repair request (for example, the specification included in the repair request form page, the payment policy, and the customer data) are transmitted from the client PC 170 to the Web server 120 via the Internet. The Web server 120 allocates one repair ID to the transmitted repair request, reads the serial number assigned to each of at least one repair-requested product included in the repair request, retrieves the purchased product table (see FIG. 9(b)) of the database 130 based on each serial number, and updates the purchased product data corresponding to each serial number to the currently transmitted specification. The Web server 120 subsequently registers the serial number, the repair-request product data (the specification shown in the repair request form page), the customer data, and the data regarding the payment policy into the repair-requested product table of the database 130 (see FIG. 9(a)) in the specific format corresponding to the currently allocated repair ID. At this moment, the repair sub-flow of the repair-requested product table has not yet been set. At the stage of receiving the repair request, an entry 'Not Start' is registered into all boxes of the $1^{st}$ to $n^{th}$ processes in the processing status table of the database 130 in the specific format corresponding to the currently allocated repair ID and the serial number (see FIG. 12(a)).

Figure 11:
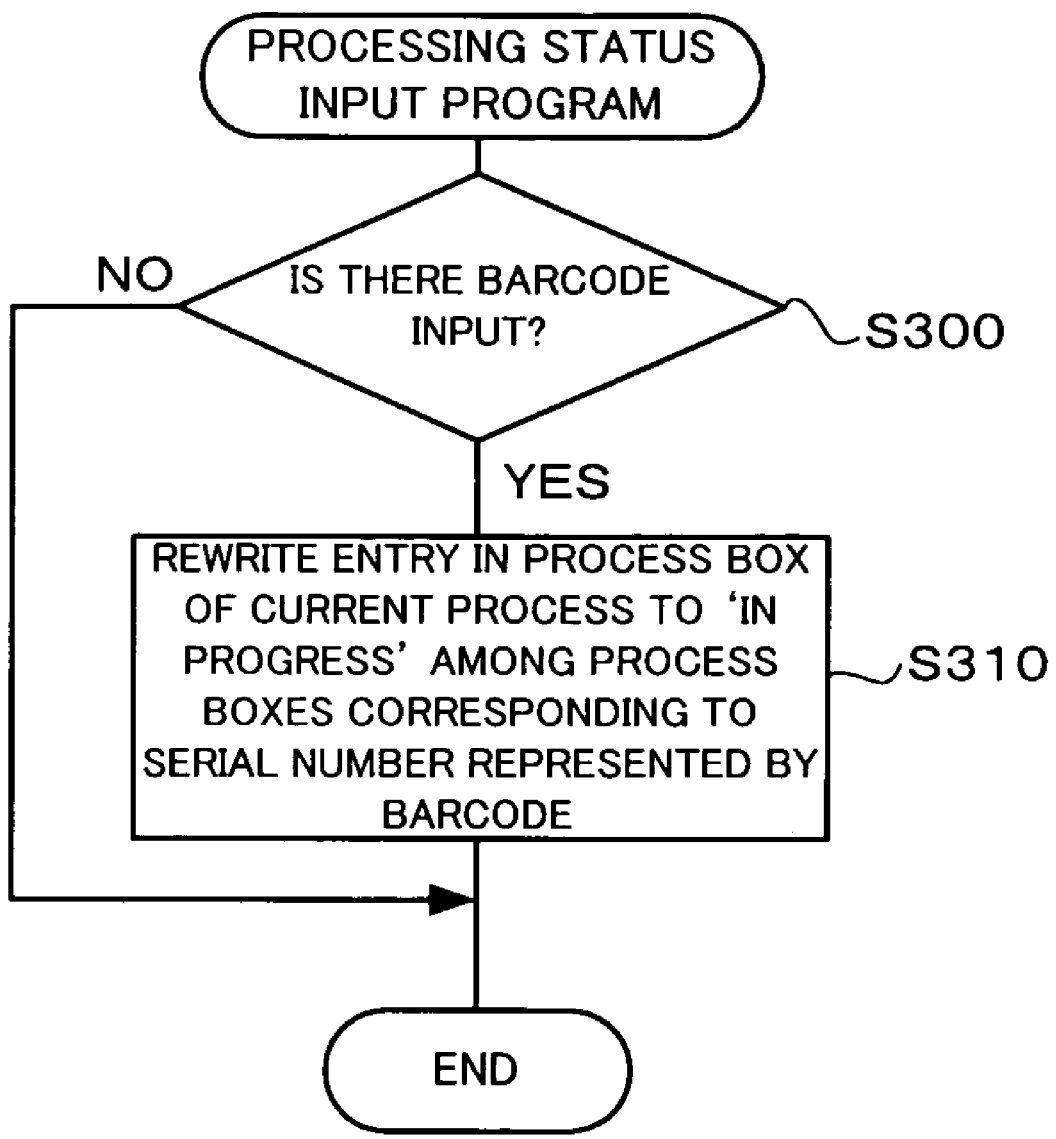
FIG. 11 is a flowchart showing a processing status input program executed by each input terminal.

A processing status input routine executed by each of the input terminals 401 to 404 in the respective repairing processes is discussed below with reference to FIG. 11. This routine is executed after the product as the repair object is sent to a repair center with the repairing process management system 110 installed therein. Each of the input terminals 401 to 404 reads a processing status input program from the application server 132, and a non-illustrated built-in CPU of each of the input terminals 401 to 404 executes this processing status input program at every preset timing (for example, at every several msec). When this program starts, each of the input terminals 401 to 404 first determines whether or not the corresponding one of the barcode readers 501 to 504 has read the barcode 164 on the barcode label 162 attached to the target 160 (step S300). When no barcode 164 has been read in, the program is terminated immediately. When the barcode 164 has been read in, on the other hand, the input terminal 401 to 404 rewrites the entry in a box of the repairing process corresponding to the input terminal from 'Not Start' to 'In Progress', while rewriting the entry in a box of the last process from 'In Progress' to 'Completed', among boxes of the multiple repairing processes corresponding to the serial number represented by the barcode 164 in the processing status table of the database 130 (step S310). The program is then terminated. The inspection process does not have the last process, so that the operation of rewriting the entry in the box of the last process at step S310 is omitted. The operator may carry out the operation of reading the barcode 164 with one of the barcode readers 501 to 504. The reading operation of the barcode 164 with one of the barcode readers 501 to 504 may otherwise be automated by automatically transporting the target 160 to a specific position where the barcode reader 501 to 504 can read the barcode 164 attached to the target 160.

For example, it is assumed that the entry in the 'HDD' box is 'Out of Order' in the 'Components Possibly Failed' field of the current repair request form and that a serial number '0001' has been assigned to the personal computer as only one product included in the repair request. When the target 160 with the serial number '0001' is sent to the inspection process, the barcode reader 501 reads the barcode 164 on the barcode label 162 attached to the casing of the target 160. The input terminal 401 inputs the current state showing that the personal computer of the serial number '0001' has entered the inspection process, via the barcode reader 501. The input terminal 401 then changes the entry in the box of the inspection process from 'Not Start' to 'In Progress' among boxes of multiple repairing processes corresponding to the serial number '0001' in the processing status table of the database 130. FIG. 12(b) shows the storage in the processing status table of the database 130 at this moment.

The Web server 120 plans a repair sub-flow, based on the results of the inspection. When the results of the current inspection show failure of the memory and the HDD, the Web server 120 prepares a repair sub-flow including replacement of the memory, replacement of the HDD, and installation of the OS in this order, based on these results of the inspection. The Web server 120 stores the prepared repair sub-flow corresponding to the serial number of the current repair-requested product into the repair-requested product table of the database 130 (see FIG. 9(a)). The database 130 has stored the 'components possibly failed' indicated by the customer in the reception process. This storage is, however, used only as the reference of determining requirement or non-requirement of inspection, and the repair sub-flow is planned, based on the results of the inspection carried out in the inspection process.

The repairing execution process carries out the respective detailed repair practices, that is, replacement of the memory, replacement of the HDD, and installation of the OS, in time series according to the planned repair sub-flow. When the target 160 is sent to the input terminal $402_1$ located in a work area of memory replacement, the barcode reader $502_1$ reads the barcode 164 on the barcode label 162 attached to the casing of the target 160. The input terminal $402_1$ inputs the current state showing that the personal computer of the serial number '0001' has entered the detailed repair practice 'Memory Replacement' in the repairing execution process, via the barcode reader $502_1$. The input terminal $402_1$ then changes the entry in the box of the detailed repair practice 'Memory Replacement' from 'Not Start' to 'In Progress' in the repairing execution process corresponding to the serial number '0001' in the processing status table of the database 130, while changing the entry in the box of the previous process or the inspection process from 'In Progress' to 'Completed'. FIG. 12(c) shows the storage in the processing status table of the database 130 at this moment. When the target 160 is sent to the input terminal $402_2$ located in a work area of HDD replacement, the barcode reader $502_2$ reads the barcode 164 on the barcode label 162 attached to the casing of the target 160. The input terminal $402_2$ inputs the current state showing that the personal computer of the serial number '0001' has entered the detailed repair practice 'HDD Replacement' in the repairing execution process, via the barcode reader $502_2$. The input terminal $402_2$ then changes the entry in the box of the detailed repair practice 'HDD Replacement' from 'Not Start' to 'In Progress' in the repairing execution process corresponding to the serial number '0001' in the processing status table of the database 130, while changing the entry in the box of the previous practice or the memory replacement from 'In Progress' to 'Completed'. FIG. 12(d) shows the storage in the processing status table of the database 130 at this moment. When the target 160 is sent to the input terminal $402_3$ located in a work area of OS installation, the barcode reader $502_3$ reads the barcode 164 on the barcode label 162 attached to the casing of the target 160. The input terminal $402_3$ inputs the current state showing that the personal computer of the serial number '0001' has entered the detailed repair practice 'OS Installation' in the repairing execution process, via the barcode reader $502_3$. The input terminal $402_3$ then changes the entry in the box of the detailed repair practice 'OS Installation' from 'Not Start' to 'In Progress' in the repairing execution process corresponding to the serial number '0001' in the processing status table of the database 130, while changing the entry in the box of the previous practice or the HDD replacement from 'In Progress' to 'Completed'. FIG. 12(d) shows the storage in the processing status table of the database 130 at this moment.

When the target 160 is sent to the input terminal 404 located in a work area of the wrapping and shipment process after the operation check process, the barcode reader 504 reads the barcode 164 on the barcode label 162 attached to the casing of the target 160. The input terminal 404 inputs the current state showing that the personal computer of the serial number '0001' has entered the wrapping and shipment process, via the barcode reader 504. The input terminal 404 then changes the entry in the box of the wrapping and shipment process corresponding to the serial number '0001' from 'Not Start' to 'In Progress' in the processing status table of the database 130, while changing the entry in the box of the previous process or the operation check process from 'In Progress' to 'Completed'. FIG. 12(e) shows the storage in the processing status table of the database 130 at this moment.

Figure 13:
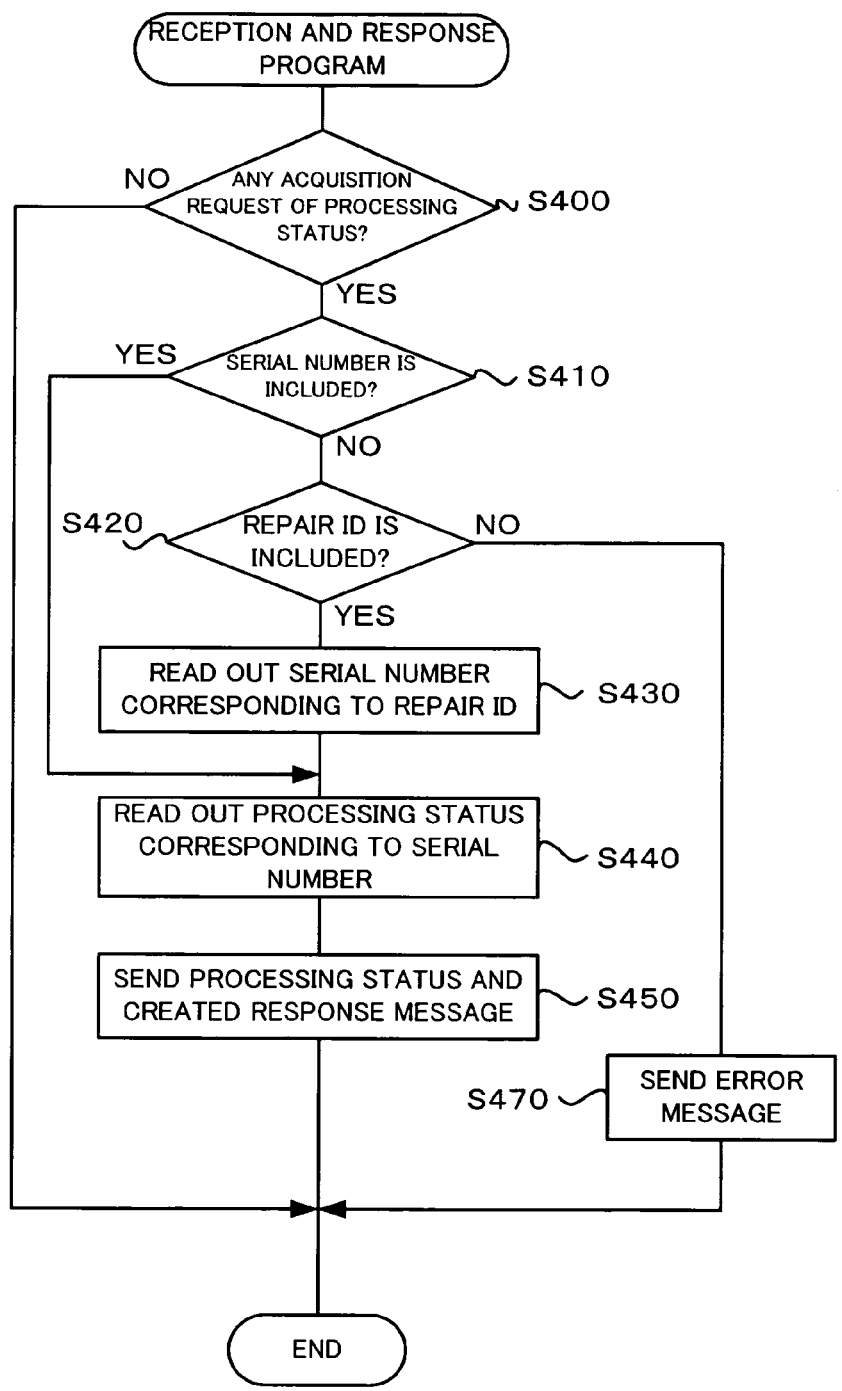
FIG. 13 is a flowchart showing a reception and response program executed by aWeb server.
Figure 15:
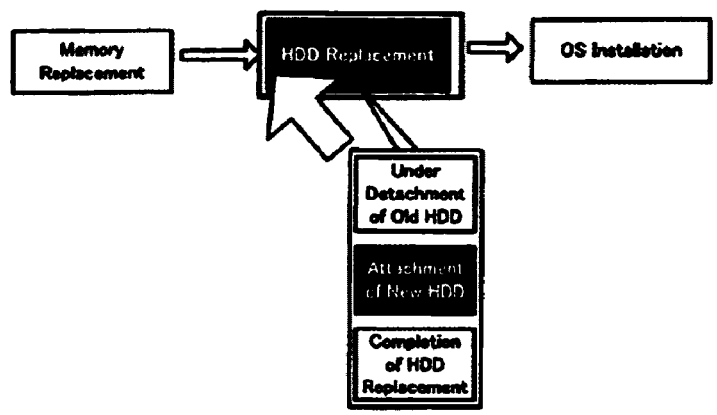
FIG. 15 shows a display of a processing status of each operation in a detailed repair practice.

A reception and response process executed by the Web server 120 is discussed below with reference to FIG. 13. A reception and response program is installed in a non-illustrated HDD of the Web server 120, and a non-illustrated built-in CPU reads and executes this reception and response program at every preset timing (for example, at every several msec). When this program starts, the Web server 120 first determines whether or not there is any inquiry from the customer concerning the location of a product included in the customer's repair request in a repair flow of multiple processes, that is, whether or not there is any acquisition request of the processing status with regard to the repair-requested product (step S400). When there is no acquisition request, the program is terminated immediately. When there is an acquisition request, on the other hand, the Web server 120 determines whether or not the acquisition request includes a serial number (step S410).

When the acquisition request does not include any serial number, the Web sever 120 determines whether or not the acquisition request includes a repair ID (step S420). When neither the serial number nor the repair ID is included, retrieval of the processing status is impossible. The Web server 120 accordingly sends an error message to the client PC 170 of the customer (step S470) and terminates this program. In the structure of this embodiment, the mailer of the client PC 170 used by the customer receives the repair ID allocated to each customer's repair request in the form of an Internet mail, which is automatically sent from the Web server 120 after the customer's repair request. When the acquisition request includes a repair ID, on the other hand, the Web server 120 reads out the serial number corresponding to the repair ID included in the acquisition request (step S430). When the acquisition request includes the serial number at step S410 or after the serial number corresponding to the repair ID is read out at step S430, the Web server 120 reads out the processing status corresponding to the serial number (step S440), and creates a response message according to the read-out processing status and sends the created response message to the client PC 170 of the customer (step S450). The program is then terminated.

For example, in response to the acquisition request of the processing status at the stage where all of the processes from the inspection process to the wrapping and shipment process have not yet started as shown in FIG. 12(a), the procedure sends a whole process flow including the reception process, the inspection process, the repairing execution process, the operation check process, and the wrapping and shipment process in this sequence as shown in FIG. 14(a) (where the 'Reception Process' is highlighted at this stage) in the form of a window and a response message like 'Your repair request is waiting for reception' to the client PC 170 of the customer. In response to the acquisition request of the processing status at the stage where the inspection process is in progress as shown in FIG. 12(b), the procedure sends the whole process flow with the 'Inspection Process' highlighted as shown in FIG. 14(b) and a response message like 'Your repair request is under inspection' to the client PC 170 of the customer. In response to the acquisition request of the processing status at the stage where one of the detailed repair practices, memory replacement, is in progress in the repairing execution process as shown in FIG. 12(c), the procedure sends the whole process flow including memory replacement, HDD replacement, and OS installation in this order as the detailed repair practices as shown in FIG. 14(c) (where the 'Memory Replacement' is highlighted at this stage) in the form of a window and a response message like 'Your repair request is under replacement of the memory' to the client PC 170 of the customer. In response to the acquisition request of the processing status at the stage where one of the detailed repair practices, HDD replacement, is in progress in the repairing execution process as shown in FIG. 12(d), the procedure sends the whole process flow with the 'HDD Replacement' practice highlighted as shown in FIG. 14(d) and a response message like 'Your repair request is under replacement of the HDD' to the client PC 170 of the customer. In response to the acquisition request of the processing status at the stage where the wrapping and shipment process is in progress as shown in FIG. 12(e), the procedure sends the whole process flow with the 'Wrapping and Shipment Process' highlighted as shown in FIG. 14(e) and a response message like 'Your repair request will be shipped soon' to the client PC 170 of the customer.

Each response message may include an additional message like 'Your repair request will be shipped in XX days' by taking into account the number of dates required for the residual repair flow. A message like 'The component AA is back order' may be created and sent to show that a certain component, which fails and is to be replaced, is back order. In the case where a failed component is newly found, a message like 'We are looking forward to your inquiry and response concerning replacement of the failed component and estimation' may be created and sent to wait for the customer's inquiry or response concerning whether or not actual replacement of the failed component is required or whether or not estimation of the repair cost is required. In this example, a failure of the memory has been found in the inspection process, and the above message with regard to the failed memory may be created and sent.

The components of the second embodiment are mapped to the components of the present invention as follows: The input terminals 401 to 404 of this embodiment correspond to the processing status input module of the present invention, the database 130 corresponds to the information storage module, and the input terminals 401 to 404 and the Web server 120 correspond to the storage control module. The Web server 120 corresponds to the request input module, the response module, the product code recognition module, the repair code allocation module, and the planning module. The barcode label 162 corresponds to the recording module, and the barcode readers 501 to 504 correspond to the read-out module.

In the structure of the embodiment discussed above, each of the input terminals 401 to 404 inputs the processing status of each repairing process with regard to each product as the object of a repair request by the customer, maps the serial number of the product to the processing status, and stores the mapping into the database 130. The Web server 120 receives an acquisition request of the processing status with regard to the product from the client PC 170 of the customer, reads the processing status from the database 130 in response to the acquisition request, and sends back the read-out processing status to the client PC 170. This arrangement facilitates management of the location of each repair-requested product in the repair flow of the multiple repairing processes or in the flow of the multiple detailed repair practices.

The input terminals 401 to 404 are located in all the repairing processes, so that all the repairing processes are specified as the management object processes. Compared with the arrangement of specifying only typical processes as the management object processes, this arrangement allows for accurate grasp of the current location of the repair-requested product in the repair flow of the multiple repairing processes or in the flow of the multiple detailed repair practices.

The serial number (product code) assigned in advance to each product is used for management of the repair. Namely it is not required to newly allocate any identification code to the product for the purpose of process management. The use of the serial number also conveniently allows for accurate grasp of the packaged component information regarding the respective components of the product.

In each repairing process, the entry of the processing status with regard to the process is changed from 'Not Start' to 'In Progress' by simply reading the barcode 164 or the product code on the barcode label 162 attached to the target 160. This desirably simplifies the input operation of the processing status.

In the repairing execution process, the repair sub-flow including multiple detailed repair practices is planned for and mapped to each repair-requested product for management. This arrangement ensures easy grasp of the failed component in the product and the processing status, as well as, in some cases, the number of days required for repair.

This arrangement conveniently allows the customer to give a repair request and make an inquiry of the processing status on the Web site managed by the Web server 120 via the Internet through operations of the client PC 170.

The Web server 120 allocates one repair ID to each repair request given by the customer, and registers the processing status of each repairing process into the processing status table of the database 130 in the specific format corresponding to the allocated repair ID and each serial number assigned to each of multiple products included in the repair request. When the target 160 is sent to each repairing process, the corresponding one of the input terminals 401 to 404 changes the entry of the processing status with regard to the repairing process to 'In Progress' in the specific format corresponding to the repair ID and the serial number in the database 130. The Web server 120 receives an acquisition request of the processing status with regard to each product included in the repair request given by the customer from the client PC 170 of the customer, reads the processing status from the database 130 in response to the acquisition request, and sends back the read-out processing status to the client PC 170. This arrangement allows for adequate management of the repairing processes with regard to the multiple products included in one repair request given by the customer.

The structure of the embodiment discussed above may be modified in various ways. For example, when there are multiple serial numbers corresponding to the repair ID at step S430, that is, when one repair request includes multiple products, the program may read the processing status corresponding to each serial number from the processing status table at step S440 and may create and send a response message according to the latest processing status among the read-out processing statuses at step S450. The response message created and sent according to the product in the latest processing status among the multiple products is generally sufficient as the index of the shipment time of the repaired products. This arrangement saves the required quantity of information and thus ensures a quick response. Each response message may include an additional message like 'The ordered product will be shipped in XX days' by taking into account the number of dates required for the residual repairing flow with regard to the product in the latest processing status. The processing statuses with regard to all the products included in one repair ID may otherwise be sent to the client PC 170 of the customer.

In the structure of the above embodiment, the Web server 120 is assigned to retrieve the database 130 based on the serial number and the repair ID and to create and send the response message, besides management of the Web site. In one possible modification, multiple servers may be used to share these required functions. For example, the Web server 120 takes charge of management of the Web site and transmission of the response message, whereas another server takes charge of retrieval of the database 130 based on the serial number and the repair ID and creation of the response message.

In the structure of the above embodiment, the barcode readers 501 to 504 are used to read the barcode 164 or the serial number and input the serial number into the corresponding input terminals 401 to 404. In one possible modification, the operator may manually input the serial number into the corresponding input terminals 401 to 404 through operations of the keyboard and the mouse.

The above embodiment regards the case of giving a repair request via the Internet. The procedure of the embodiment may also be applicable to repair requests by telephone. In this case, the operator manually inputs a repair request into the Web server 120 through operations of the keyboard and the mouse. In the same manner as the embodiment discussed above, the Web server 120 allocates one repair ID to each repair request.

The structure of the above embodiment manages the processing statuses with regard to all the repairing processes. One possible modification may select typical processes among all the repairing processes and manage the processing statuses of the selected processes.

In the structure of the embodiment discussed above, one possible modification gives a display of operations included in each detailed repair practice of the repairing execution process and a current operation in progress. For example, in the window of FIG. 14(*d*), when the customer selects HDD replacement as the detailed repair practice through operations of the keyboard and the mouse, this modified structure displays a list of operations included in the selected HDD replacement practice (detachment of an old HDD, attachment of a new HDD, and completion of HDD replacement). The current operation in progress, for example, attachment of a new HDD, is highlighted on the display. This modified arrangement more precisely informs the customer of the processing status of each detailed repair practice.

In the structure of the above embodiment, the acquisition request is input from the client PC 170 of the customer. Instead of or in addition to such input, the acquisition request may be output from a management computer, which is connected to the LAN 142 of the system 110, to the Web server 120. This modification facilitates management of the repairing process of each product in the system.

In the structure of the above embodiment, the input terminals 401 to 404 execute the processing status input program, while the Web server 120 executes the reception and response program. In one possible modification, the Web server 120 may execute both of these programs. For example, the Web server 120 is connected to the LAN 142 to receive barcode information read by the barcode readers 501 to 504 and to execute the processing of step S310.

What is claimed is:

1. A process management system that manages a current location of a preset product in a process flow of multiple processes for manufacture or repair, said process management system comprising:
    a processing status input module that inputs a processing status of at least one process selected among the multiple processes (referred to as 'management object process') with regard to the preset product;
    an information storage module that is capable of storing various pieces of information;
    a storage control module that maps the preset product to the processing status and stores the mapping into said information storage module;
    a request input module that inputs an acquisition request to acquire the processing status with regard to the preset product;
    a response module that reads, in response to the acquisition request, the processing status mapped to the preset product from said information storage module and outputs the read-out processing status to a request source, which has output the acquisition request;
    a product code assignment module that assigns a product code to each product;
    wherein said storage control module maps the product code to the processing status and stores the mapping into said information storage module, said request input module inputs the acquisition request including the product code that identifies the product, and said response module reads, in response to the acquisition request, the processing status corresponding to the product code from said information storage module and outputs the read-out processing status to the request source;
    a recording module that records the product code, which is attached to the product that is being manufactured or has been completed and corresponds to the product; and
    a read-out module that reads the product code recorded in said recording module when the product enters each management object process;
    wherein said processing status input module, when the product code is read by said read-out module at each management object process, inputs a start of processing as the processing status of the management object process.

2. A process management system in accordance with claim 1, wherein said response module reads, in response to the acquisition request, the processing status mapped to the preset product from said information storage module and either directly outputs the read-out processing status to the request source or converts the read-out processing status into a specific form according to the acquisition request and outputs the converted processing status to the request source.

3. A process management system in accordance with claim 2, wherein, in the case of converting the read-out processing status into the specific form according to the acquisition request and outputting the converted processing status to the request source, said response module generates display information, which enables the process in the read-out processing status to be visually located in the process flow of the multiple processes and outputs the generated display information to the request source.

4. A process management system in accordance with claim 1, wherein said processing status input module specifies all the multiple processes in the process flow with regard to the preset product as management object processes and inputs processing statuses of the specified management object processes.

5. A process management system in accordance with claim 1, wherein said request input module inputs the acquisition request of the processing status with regard to the preset product from one of a customer who has ordered the preset product, a customer who has requested repair of the preset product, and a system administrator via a network, and
    said response module outputs the processing status to the request source via the network.

6. A process management system in accordance with claim 1, wherein the product code is mapped to packaged component information of the product.

7. A process management system in accordance with claim 1, said process management system managing the current location of the preset product in a manufacturing process flow of the multiple processes, said process management system further comprising:
    an order code allocation module that allocates one identical order code to at least one product ordered together by a customer,
    wherein said request input module inputs the acquisition request of the processing status with regard to the at least one product with the identical order code allocated thereto, and
    said response module reads, in response to the acquisition request, the processing statuses with regard to the at least one product from said information storage module, and outputs the read-out processing statuses to the request source.

8. A process management system in accordance with claim 7, wherein said response module reads, in response to the acquisition request, the processing statuses with regard to the at least one product from said information storage module, and outputs a latest processing status among the read-out processing statuses to the request source.

9. A process management system in accordance with claim 1, said process management system managing the current location of the preset product in a repairing flow of the multiple processes, said process management system comprising:
    a product code recognition module that recognizes a product code, which has been assigned in advance to each product,
    wherein said storage control module maps the product code to the processing status and stores the mapping into said information storage module,
    said request input module inputs the acquisition request including the product code that identifies the product, and
    said response module reads, in response to the acquisition request, the processing status corresponding to the product code from said information storage module and outputs the read-out processing status to the request source.

10. A process management system in accordance with claim 9, said process management system further comprising:
    a recording module that records the product code, which is attached to the product that is being repaired or has been repaired and corresponds to the product; and a read-out module that reads the product code recorded in said recording module when the product enters each management object process, wherein said processing status input module, when the product code is read by said read-out module at each management object process, inputs a start of processing as the processing status of the management object process.

11. A process management system in accordance with claim 9, wherein the product code is mapped to packaged component information of the product.

12. A process management system in accordance with claim 1, said process management system managing the current location of the preset product in a repairing flow of the multiple processes, said process management system comprising:

a repair code allocation module that allocates one identical repair code to at least one product as objects of one repair request given by a customer, wherein said request input module inputs the acquisition request of the processing status with regard to the at least one product with the identical repair code allocated thereto, and said response module reads, in response to the acquisition request, the processing statuses with regard to the at least one product from said information storage module, and outputs the read-out processing statuses to the request source.

13. A process management system in accordance with claim 12, wherein said response module reads, in response to the acquisition request, the processing statuses with regard to the at least one product from said information storage module, and outputs a latest processing status among the read-out processing statuses to the request source.

14. A process management system in accordance with claim 1, said process management system managing the current location of the preset product in a repairing flow of the multiple processes, wherein said multiple processes include a repairing execution process to actually carry out repair, the repairing execution process follows a repair sub-flow including a series of detailed repair practices carried out with regard to each component to be repaired, and said processing status input module inputs the processing status of each detailed repair practice in the repairing execution process, in addition to or in place of the processing status of each process.

15. A process management system in accordance with claim 14, said process management system further comprising:

a planning module that plans the repair sub-flow with regard to the preset product as an object of a repair request given by a customer.

16. A process management system in accordance with claim 15, wherein said planning module plans the repair sub-flow, based on a result of inspection of the preset product as the object of the repair request given by the customer.

17. A process management system in accordance with claim 14, wherein said response module, when the processing status read from said information storage module in response to the acquisition request corresponds to one of the detailed repair practices included in the repair sub-flow, outputs information for identifying the corresponding detailed repair practice in the repair sub-flow to the request source.

18. A process management method that uses one or multiple computers with an information storage module to manage a current location of a preset product in a process flow of multiple processes for manufacture or repair, said process management method comprising:

a processing status input step that causes the computer to input a processing status of at least one process selected among the multiple processes (referred to as 'management object process') with regard to the preset product;

a storage control step that causes the computer to map the preset product to the processing status and store the mapping into said information storage module;

a request input step that causes the computer to input an acquisition request of acquiring the processing status with regard to the preset product; and a response step that causes the computer to read, in response to the acquisition request, the processing status mapped to the preset product from said information storage module and output the read-out processing status to a request source, which has output the acquisition request;

wherein said storage control step maps a product code, which is assigned to each product, to the processing status and stores the mapping into said information storage module, said request input step inputs the acquisition request including the product code that identifies the product, and said response step reads, in response to the acquisition request, the processing status corresponding to the product code from said information storage module and outputs the read-out processing status to the request source; and wherein said processing status input step reads the product code from a recording module that records the product code, which is attached to the product that is being manufactured or has been completed or that is being repaired or has been repaired and corresponds to the product when the product enters each management object process, and inputs a start of processing as the processing status of the management object process.

19. A process management method in accordance with claim 18, said process management method further comprising:

an order code allocation step that causes the computer to allocate one identical order code to at least one product ordered together by a customer, wherein said request input step inputs the acquisition request of the processing status with regard to the at least one product with the identical order code allocated thereto, and said response step reads, in response to the acquisition request, the processing statuses with regard to the at least one product from said information storage module, and outputs the read-out processing statuses to the request source.

20. A process management method in accordance with claim 18, said process management method further comprising:

an order code allocation step that causes the computer to allocate one identical repair code to at least one product as objects of one repair request given by a customer, wherein said request input step inputs the acquisition request of the processing status with regard to the at least one product with the identical repair code allocated thereto, and said response step reads, in response to the acquisition request, the processing statuses with regard to the at least one product from said information storage module, and outputs the read-out processing statuses to the request source.

* * * * *